United States Patent [19]
Moyer et al.

[11] Patent Number: 5,812,798
[45] Date of Patent: Sep. 22, 1998

[54] DATA PROCESSING SYSTEM FOR ACCESSING AN EXTERNAL DEVICE AND METHOD THEREFORE

[75] Inventors: William C. Moyer, Dripping Springs; Sek Li Chin, Austin, both of Tex.

[73] Assignee: Motorola, Inc., Schaumburg, Ill.

[21] Appl. No.: 592,271

[22] Filed: Jan. 26, 1996

[51] Int. Cl.$^6$ ............................................. G06F 13/00
[52] U.S. Cl. ................................. 395/307; 395/306
[58] Field of Search ............................ 395/307, 886, 395/306

[56] References Cited

U.S. PATENT DOCUMENTS

| | | | |
|---|---|---|---|
| 3,979,730 | 9/1976 | Bennett et al. | 340/172.5 |
| 4,020,472 | 4/1977 | Bennett et al. | 340/172.5 |
| 4,379,327 | 4/1983 | Tietjen et al. | 364/200 |
| 4,633,437 | 12/1986 | Mothersole et al. | 364/900 |
| 4,683,534 | 7/1987 | Tietjen et al. | 364/200 |
| 4,766,538 | 8/1988 | Miyoshi | 395/325 |
| 4,811,202 | 3/1989 | Schabowski | 395/287 |
| 5,247,619 | 9/1993 | Mutoh et al. | 395/283 |
| 5,274,763 | 12/1993 | Banks | 395/250 |
| 5,300,811 | 4/1994 | Suzuki et al. | 257/691 |
| 5,404,481 | 4/1995 | Miyamori | 395/425 |
| 5,446,845 | 8/1995 | Arroyo et al. | 395/250 |
| 5,471,632 | 11/1995 | Gavin et al. | 395/284 |
| 5,537,659 | 7/1996 | Nakao | 395/307 |
| 5,548,766 | 8/1996 | Kaneko et al. | 395/775 |
| 5,548,794 | 8/1996 | Yishay et al. | 395/871 |
| 5,561,771 | 10/1996 | Harriman, Jr. et al. | 395/308 |
| 5,613,078 | 3/1997 | Kishigami | 395/306 |

OTHER PUBLICATIONS

"MC68020 32–Bit Microprocessor User's Manual Fourth Edition" published by Motorola, Inc. in 1990, pp. 7–6 through 7–13 and 7–22 through 7–23.

Primary Examiner—Jack B. Harvey
Assistant Examiner—David A. Wiley

[57] ABSTRACT

A data processor (10) flexibly interfaces with both a variety of memory devices and external peripheral devices. A control register (94) is provided for dynamically controlling a data bus configuration of the data processor. A set of bits (DSZ) in the control register (94) provides configuration control which indicates a width of data communicated with the data processor and a configuration of the integrated circuit terminals (124) by which the information is communicated.

8 Claims, 4 Drawing Sheets

FIG.3

Register 300:
| Bit | 31-15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | WSC | WSC | WSC | WSC | DA | DA | DA | EBC | DSZ | DSZ | DSZ | WP | PF | PA | CSEN |
| W | | | | | | | | | | | | | | | | |
| RESET | | | | | | | | | | | | | | | 0 | 0 |

Register 400 (same structure)

95

DATA PROCESSING SYSTEM FOR ACCESSING AN EXTERNAL DEVICE AND METHOD THEREFORE

CROSS REFERENCE TO RELATED, COPENDING APPLICATIONS

Related subject matter is contained in the following copending patent applications:

"A Data Processing System For Writing An External Device And Method Therefor" by William C. Moyer et al., Ser. No. 08/534,764 filed Sep. 27,1995; and "A Data Processing System For Accessing An External Device And Method Therefor" by William C. Moyer, Ser. No. 08/510,510 and filed Aug. 2, 1995.

FIELD OF THE INVENTION

The present invention relates in general to a data processing system, and more particularly to a method and apparatus for accessing an external device in a data processing system.

BACKGROUND OF THE INVENTION

Integrated circuit microprocessors must, in many cases, be connected with external integrated circuit devices in order to provide certain functions. Examples of such external devices include ASIC devices having limited pin counts, memories, serial interface adapters, analog-to-digital converters and many others. In addition to performing different functions, each of these external devices may also require varying data bus widths. For example, a memory may require an eight bit data bus width, a first peripheral device may require a sixteen bit data bus width, and a second peripheral device may require a thirty-two bit data bus width. To interface with the plurality of peripheral devices which require different bus widths, an integrated data processor may implement a port configuration solution based on a pin configuration or a more flexible solution having dynamic bus sizing circuitry.

The port configuration solution configures a data port of an integrated circuit data processor in a fixed manner. An external device is then connected to the data processor in a manner dependent on the configuration of the data port. For example, if an external device having eight or sixteen bits is connected to a data port of the data processor having thirty-two bits, the external device must be placed on fixed integrated circuit terminals of the data processor in the port configuration solution. For example, a data processor may have a thirty-two bit external data bus and support accesses to eight bit external devices as long as the external devices reside on data bus bits D31 through D24. Similarly, the data processor will support accesses to sixteen bit devices on data bus bits D31 through D16. Thus, in the port configuration solution, the external device must be connected to the appropriate integrated circuit terminals of the data processor to perform a data communication operation properly.

Furthermore, in a data processing system in which there are multiple external devices or memory banks that have data port widths which are less than thirty-two bits, the data bits which are designated for connection to eight bit external devices are also necessarily used by external devices having data bus widths of sixteen and thirty-two bits. Such imbalanced loading on one set of integrated circuit terminals of the data processor results in poor timing and power consumption.

In a more flexible solution, dynamic bus sizing circuitry is implemented in the data processor. In a dynamic bus sizing solution, when the data processor accesses an external device, the data processor waits for the external device to respond with an indication of a corresponding data bus width.

For example, the MC68020 microprocessor available from Motorola, Inc. of Austin, Tex., dynamically determines whether a data bit width is eight, sixteen, and thirty-two bits during each bus cycle. During a data transfer operation, an external device coupled to the microprocessor signals a data bit width which is required. A plurality of inputs are provided to the microprocessor to indicate the data bit width.

If the MC68020 microprocessor executes an instruction that requires a read of a long word operand, the processor will attempt to read thirty-two bits during the first bus cycle. If the port responds that it is thirty-two bits wide, the process will latch all thirty-two bits of data and continue with a next operation. If the port responds that it is sixteen bits wide, the processor latches the sixteen bits of valid data and executes another cycle to obtain the remaining sixteen bits. An eight bit port is handled similarly, but four read cycles are executed. Each port of the external device is assigned to a particular section of a data bus. For example, a thirty-two bit port is located on data bus bits 31 through 0, a sixteen bit port is located on data bus bits 31 through 16, and an eight bit port is located on data bus bits 31 through 24.

As in the previous prior art example described above, in a data processing system in which there are multiple external devices or memory banks that have data port widths which are less than thirty-two bits, certain portions of the data bus will always be used because at least eight data bits will be communicated between the external device and the microprocessor. For example, data bus bits 31 through 24 will be used to communicate information for eight bit, sixteen bit, and thirty-two bit ports. The remaining data bits may be used less often because they are used only for sixteen or thirty-two bit ports. Such imbalanced loading on one set of integrated circuit terminals of the data processor results in poor timing and power consumption.

While each of these bus sizing solutions provides a method for enabling a integrated circuit data processor to interface with external devices requiring data values having different widths, each of these bus sizing solutions increases the overhead costs of the data processor and fails to fully and efficiently use the bandwidth of the integrated circuit data processor. Thus, there is a need for a flexible yet low-cost bus sizing circuit for integrated circuit microprocessors.

BRIEF DESCRIPTION OF THE DRAWINGS

FIG. 3 illustrates in tabular form a plurality of control registers in accordance with one embodiment of the present invention.

DESCRIPTION OF THE PREFERRED EMBODIMENTS

Figure 1:
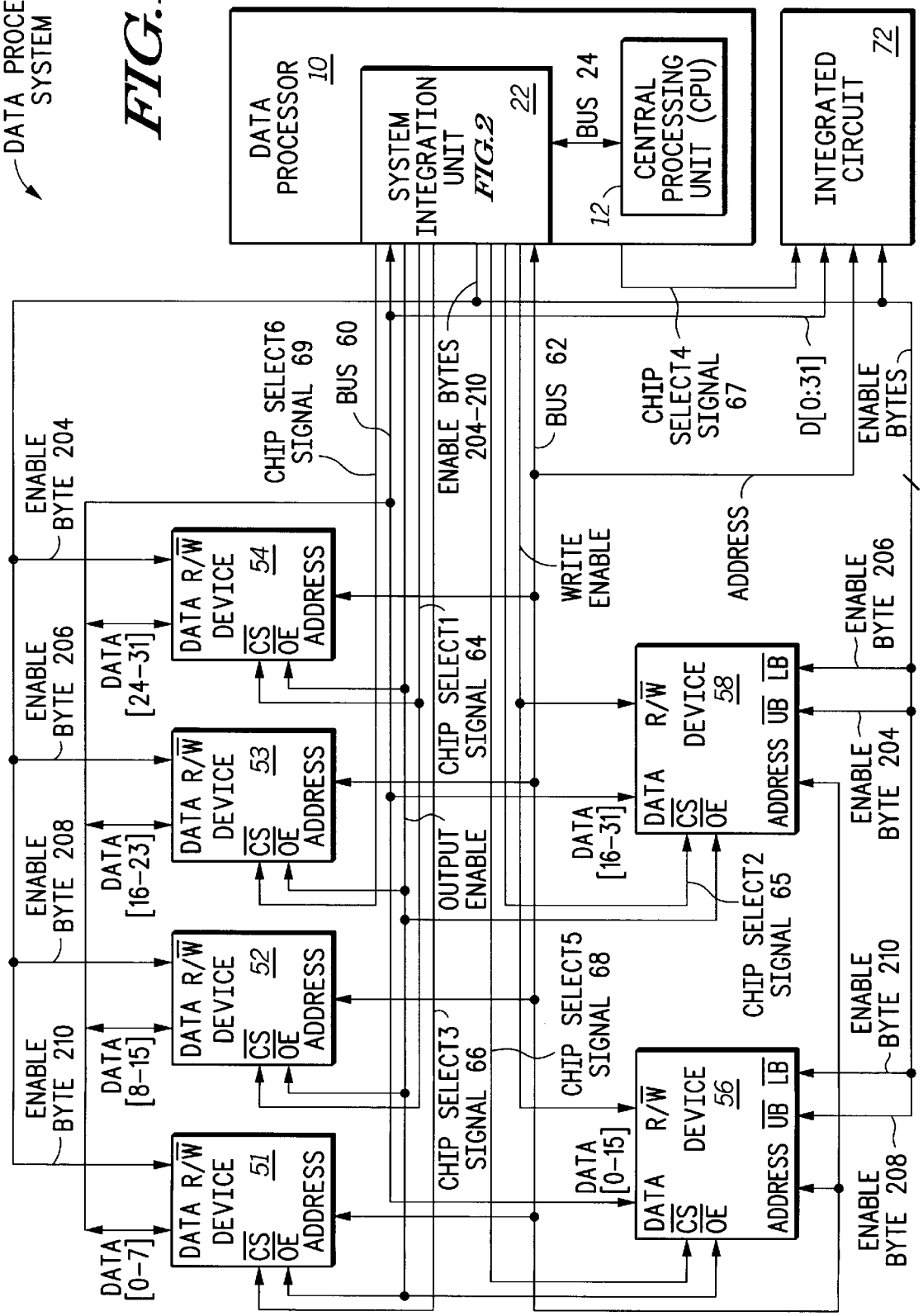
FIG. 1 illustrates in block diagram form a data processing system in accordance with one embodiment of the present invention.

The present invention provides a data processor and method of operating a data processing system which allows a user great flexibility in selecting both a variety of memory devices and external peripheral devices that will interface with the data processor. In the data processor, a control register is provided for dynamically controlling a plurality of integrated circuit terminals which receive data from the external peripheral devices. Stated another way, the present invention allows the user to locate external devices having an eight bit data bus width to be located on any byte lane of a data bus of the data processor. Additionally, the present invention allows the user to locate sixteen bit external devices on one of two halves of a thirty-two data bus of the data processor.

Furthermore, the present invention includes this first set of bits in a chip select register which is selectively accessed on a timing cycle by timing cycle basis. As the data processing system accesses an external device, a corresponding chip select register is also accessed to provide proper timing and control information to the external device. Therefore, at each timing cycle, a different chip select register and different timing and control information may be accessed. In the present embodiment of the invention, the ability to select a value controlling a position of data provided by an external device on the data bus of the data processor dynamically and in response to a memory location currently being accessed provides a user with greater functional flexibility without increasing overhead costs or power consumption.

In a following discussion, the connectivity and operation of one embodiment of a data processing system which implements the present invention will be provided in greater detail.

CONNECTIVITY OF THE PRESENT INVENTION

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Furthermore, brackets will be used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

Referring now to FIG. 1, FIG. 1 illustrates a data processing system 15 having a data processor 10, a device 51, a device 52, a device 53, a device 54, a device 56, and a device 58, and an integrated circuit 72. Data processor 10 includes a central processing unit (CPU) 12 and a system integration circuit 22. In one embodiment of the present invention, data processor 10 and each of devices 51, 52, 53, 54, 56, and 58 is implemented as a separate integrated circuit. In alternate embodiments of the present invention, all of data processing system 15 may be implemented on a single integrated circuit.

In FIG. 1, device 56 has a data port which is coupled to conductors [0–15] of bus 60 for receiving data bits [0–15]. Device 56 also has an address port which is coupled to conductors [0–31] of bus 62. In addition, device 56 has a chip select input ($\overline{CS}$) which is coupled to a Chip Select5 conductor 68 for receiving a second chip select signal. Device 56 also has an output enable input ($\overline{OE}$) which is coupled to the Output Enable signal and a Read/Write (R/$\overline{W}$) input which is coupled to a Write Enable signal. Device 56 also has an upper byte ($\overline{UB}$) input which is coupled to Enable Byte signal 208 and a lower byte ($\overline{LB}$) input which is coupled to Enable Byte signal 210.

Device 58 has a data port which is coupled to conductors [16–31] of bus 60 for receiving data bits [16–31]. Device 58 also has an address port which is coupled to conductors [0–31] of bus 62. In addition, device 58 has a chip select input ($\overline{CS}$) which is coupled to a Chip Select2 conductor 65 for receiving a second chip select signal. Device 58 also has an output enable input ($\overline{OE}$) which is coupled to the Output Enable signal and a Read/$\overline{Write}$(R/$\overline{W}$) input which is coupled to the Write Enable signal. Device 58 also has an upper byte ($\overline{UB}$) input which is coupled to Enable Byte signal 204 and a lower byte ($\overline{LB}$) input which is coupled to Enable Byte signal 206.

Data processor 10 is coupled to each of devices 51, 52, 53, and 54 by busses 60 and 62. Data processor 10 is coupled to a chip select ($\overline{CS}$) input of device 51 via a Chip Select 3 signal 66 and a chip select ($\overline{CS}$) input of device 52 via a Chip Select 6 signal 69. Furthermore, data processor 10 is coupled to a chip select ($\overline{CS}$) input of devices 53 and 54 via a Chip Select 1 signal 64. Data processor 10 is coupled to integrated circuit 72 by bus 60, bus 62, the Enable Bytes conductors, and a Chip Select4 conductor 67.

Note that in some embodiments of the present invention, data processor 10 is formed on a single integrated circuit. In some embodiment, data processor 10 is a single chip microcontroller. In alternate embodiments, data processor 10 may be implemented using any type of electrical circuitry. Devices 56 and 58 may be any type of memory. Alternate embodiments of data processing system 15 may include more, fewer, or different peripheral devices (72). In addition, although busses 60 and 62 have been illustrated as 32-bit busses, alternate embodiment of the present invention may use any number of bits in busses 60 and 62.

Figure 2:
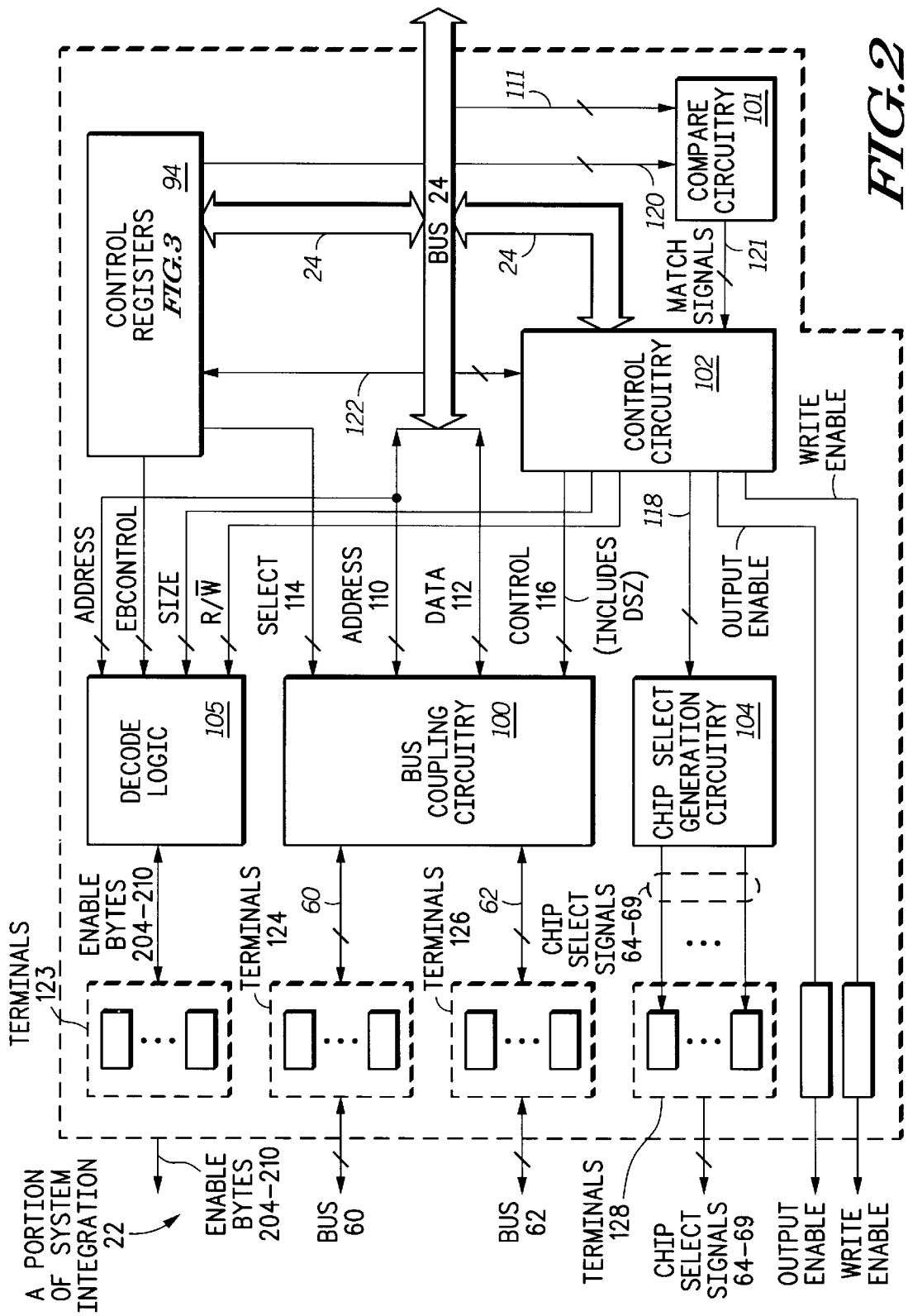
FIG. 2 illustrates in block diagram form a system integration unit of the data processing system of FIG. 1.

FIG. 2 illustrates a portion of system integration circuitry 22 of FIG. 1 in accordance with one embodiment of the present invention. System integration circuitry 22 includes control registers 94, bus coupling circuit 100, compare circuitry 101, control circuitry 102, chip select generation circuitry 104, decode logic 105, terminals 123, terminals 124, terminals 126, and terminals 128. Bus 24 bi-directionally transfers address, data, and control information to each of control registers 94, control circuitry 102, and bus coupling circuitry 100. Address bus 110 is a portion of bus 24 which provides address bits [0–31] to bus coupling circuitry 100. Data bus 112 is a portion of bus 24 which provides data bits [0–31] to bus coupling circuitry 100. Control bus 116 is a portion of bus 24 which provides control information from bus coupling circuitry to control circuitry 102. Note that in some embodiments of the present invention, control circuitry 102 may provide external bus cycle control signals (e.g. address strobe, data strobe, write enable, column address strobe, row address strobe, read/write, etc.) external to data processor 10 by way of one or more terminals (not shown). Bus 24 is coupled to control registers 94 such that CPU 12 may perform read and write accesses to control registers 94. Bus 24 is coupled to control circuitry 102 in order to provide and receive control information. Bus 24 is coupled to bus coupling circuit 100 by way of address bus 110 and data bus 112 in order to communicate address bits [0–31] and data bits [0–31]. And, bus 24 is coupled to compare circuitry 101 via a signal 111 to provide at least a portion of address bits [0–31].

Registers 94 include a plurality of peripheral control registers 95 (in FIG. 3) and a chip select control register (not shown herein). The chip select control register includes bus loading control bits, address range bits, and other chip select control bits. Bus loading control bits are provided to bus coupling circuit 100 by conductors 114. Compare circuitry 101 is coupled to the chip select control register to receive the address range bits, and possibly one or more of the other chip select control bits. Compare circuitry 101 provides compare results signals to control circuitry 102 via a plurality of conductors 121. Control circuitry 102 provides control signals to bus coupling circuit 100 by a plurality of conductors 116, and control circuitry 102 provides control signals to chip select generation circuitry 104 via a plurality of conductors 118. Control circuitry 102 also provides an Output Enable signal and a Write Enable signal. Control circuitry 102 is bi-directionally coupled to control registers 94. In one embodiment of the present invention, control circuitry 102 receives control bits from the chip select control bits stored in control registers 94 and provides status information back to other chip select control bits. Note that in alternate embodiments of the present invention, the functionality of control circuitry 102 and bus coupling circuit 100 may be combined into one circuit.

Bus coupling circuit 100 is bi-directionally coupled to terminals 124 via a bus 60. Bus coupling circuit 100 is bi-directionally coupled to terminals 126 via a bus 62. Chip select generation circuitry 104 is bi-directionally coupled to terminals 128 via a plurality of chip select conductors 64–67. The plurality of terminals 124 are used to provide bus 60 externally to data processor 10. The plurality of terminals 126 are used to provide bus 62 externally to data processor 10. And, the plurality of terminals 128 are used to provide chip select signals 64 through 69 externally to data processor 10.

Integrated circuit terminals 124, 126, and 128 may be any type of apparatus which allows electrical signals to be transferred to or from data processor 10. For example, integrated circuit terminals 124, 126, and 128 may be integrated circuit terminals, solder bumps, or wire conductors.

Referring now to FIG. 3, FIG. 3 illustrates a portion of the control registers 94 of FIG. 2 in accordance with one embodiment of the present invention. In one embodiment of the present invention, the portion of control registers 94 include a plurality of registers 300 through 400 wherein a predetermined one of the plurality of registers corresponds to a predetermined one of the plurality of chip select signals. For example, a first chip select signal corresponds to control register 300 and a last chip select signal corresponds to control register 400.

Each of the plurality of registers 300 through 400 includes a CSEN (Chip Select ENable) bit which controls an operation of a corresponding one of the plurality of Chip Select signals 64 through 69. If the CSEN bit is a logic zero value for a given Chip Select signal, a corresponding integrated circuit terminal is disabled and an output is always negated. An attempt by data processor 10 to access an address mapped by the corresponding Chip Select signal will result in a transfer error and the Chip Select signal will not be asserted. When the CSEN bit is a logic one value, the corresponding integrated circuit terminal is enabled and provides an asserted Chip Select signal when an access address falls within a range corresponding to an external device and the Chip Select signal. The CSEN bit is cleared during a reset operation.

Additionally, each of the plurality of registers includes a PA (Pin Assert) bit. The PA bit is used to assert or negate an active-low output when the integrated circuit terminal corresponding to the Chip Select signal is operating as a programmable output pin. The PA bit is ignored if a PF bit is cleared or the CSEN bit is set.

Each of the plurality of registers also includes a PF (Pin Function) bit The PF bit is used to select a function of the corresponding integrated circuit terminal. For example, when the PF bit is a logic zero value, the integrated circuit terminal is used as a chip select output. When the PF bit is a logic one value, the integrated circuit terminal is used as a programmable output control integrated circuit terminal if the CSEN bit is cleared.

Each of the plurality of registers 300 through 400 also includes a WP (Write Protect) bit. The WP bit is used to restrict write operations to an address range defined by a corresponding Chip Select signal. When the WP bit is a logic zero value, write operations are allowed in the address range defined by the corresponding Chip Select signal. When the WP bit is a logic one value, write operations are prohibited. If data processor 10 attempts to write to an address mapped by the corresponding Chip Select signal, a transfer error is sent to CPU 12 and the Chip Select signal is remains negated.

The DSZ (Data Port Size) bits illustrated in FIG. 3 define a data bit width of a device data port as well as a plurality of integrated circuit terminals which will comprise the device data port. For example, if the DSZ bits have a binary value of %000, data processor 10 is configured to communicate data via an eight bit port which resides on a plurality of integrated circuit terminals which provides data bits D31 through D24 to Bus 60. Similarly, if the DSZ bits have a binary value of %001, data processor 10 is configured to communicate data via an eight bit port which resides on a plurality of integrated circuit terminals which provides data bits D23 through D16 to Bus 60. Additionally, if the DSZ bits have a binary value of %010, data processor 10 is configured to communicate data via an eight bit port which resides on a plurality of integrated circuit terminals which provides data bits D15 through D8 to Bus 60. Furthermore, if the DSZ bits have a binary value of %011, data processor 10 is configured to communicate data via an eight bit port which resides on a plurality of integrated circuit terminals which provides data bits D7 through D0 to Bus 60.

For data values having a bit width of sixteen bits, the data may be received by data processor 10 using one of two pluralities of integrated circuit terminals. If the DSZ bits have a binary value of %100, data processor 10 is configured to communicate data via an sixteen bit port which resides on a plurality of integrated circuit terminals which provides data bits D31 through D16 to Bus 60. Similarly, if the DSZ bits have a binary value of %101, data processor 10 is configured to communicate data via a sixteen bit part which resides on a plurality of integrated circuit terminals which provides data bits D15 through D0 to Bus 60.

When data processor receives a data value having a data bit width of thrity-two, the DSZ bits are set to %110 and data processor 0 is configured to communicate all thirty-two bits of data on a plurality of integrated circuit terminals typically designated for receiving data bits, D31 through D0.

A Table 1 provided below for summarizing the configuration of the DSZ bits.

TABLE 1

| DSZ Bits | Function |
| --- | --- |
| 000 | 8 bit port resides on integrated circuit terminals D31–D24 |
| 001 | 8 bit port resides on integrated circuit terminals D23–D16 |
| 010 | 8 bit port resides on integrated circuit terminals D15–D8 |
| 011 | 8 bit port resides on integrated circuit terminals D7–D0 |
| 100 | 16 bit port resides on integrated circuit terminals D31–D16 |
| 101 | 16 bit port resides on integrated circuit terminals D15–D0 |
| 110 | 32 bit port resides on integrated circuit terminals D31–D0 |

The EBC (Enable Byte Control) bits indicate which access types should assert a plurality of Enable Byte signals, referred to Enable Bytes 204 through 210 in FIG. 2. Additionally, the Enable Bytes are referred to as EB0 204, EB1 206, EB2 208, and EB3 210 in FIG. 1. When any one of the Enable Byte Control bits is a logic zero value, read and write accesses by data processor 10 are allowed to assert a corresponding one of the plurality of Enable Byte signals. Thus, when the EBC bits are a logic zero value, a corresponding Enable Byte signal is configured to operate as a byte enable. However, when any one of the Enable Byte Control bits is a logic one value, only write accesses by data processor 10 are allowed to assert a corresponding one of the plurality of Enable Byte signals. Therefore, when the EBC bits are a logic one value, the corresponding Enable Byte signal is configured to operate as a write enable. The EBC bits may be configured differently for each of the plurality of registers 95 and, therefore, for each of the plurality of Chip Select signals.

Each of the plurality of registers 95 also includes a DA (Device Attributes) value which is used to indicate device specific attributes and WSC (Wait State Control) value which programs a number of wait states for an access to an external device connected to a Chip Select signal. In this embodiment of the invention, an encoding of 111 indicates that an external Transfer Acknowledge (TA) input signal will be sampled to terminate a cycle. Note that a TA signal indicates when an external access has been terminated. All other encodings of the WSC bits enable an internally generated termination. When an access is internally terminated, a state of the TA signal is ignored.

Note that alternate embodiments of the present invention may use more, fewer, or different register bit fields, and each register bit field may be used for control, status, or both control and status. In addition, alternate embodiment of the present invention may locate bit fields such as the DSZ bits in one or more separate registers. Also, different embodiments of the present invention may include any numbers of bits for each of the register bits fields illustrated in FIG. 3. Additionally, in some embodiments of the present invention, the control functionality of one or more of the register bit fields may be combined and encoded into fewer register bit fields.

OPERATION OF THE PRESENT INVENTION

Operation of the present invention will now be discussed in greater detail. During operation of data processing system 15 illustrated in FIG. 1, data processor 10 may access data stored in either memory bank 55 or integrated circuit 70. Each of these external devices may require a different interface. For example, in the example illustrated in FIG. 1, each of devices 51, 52, 53, and 54 has a data bus bit width of eight bits. Devices 56 and 58 have a data bus bit width of sixteen bits and require data processor 10 to specify whether only a lower byte or both an upper and a lower byte should be retrieved from the corresponding device. Furthermore, integrated circuit 72 requires a data bus width of thirty-two bits. Even given the significant differences in the interfaces of device 51, device 52, device 53, device 54, device 56, device 58, and integrated circuit 70, the present invention implemented in data processor 10 provides each external device with the appropriate control and data values without added logic circuitry or software intervention.

Before describing the present invention in greater detail, a general description of operation of data processing system 15 will be provided. In data processing system 15, each of the external devices is assigned an address range in a memory map of data processor 10. For example, devices 53 and 54 are enabled by a Chip Select1 signal 64 when data processor 10 accesses a first address range. When data processor 10 accesses an address within a second address range, a Chip Select2 signal 65 is asserted to enable device 58. Furthermore, device 51 is enabled by a Chip Select3 signal 66 when data processor 10 accesses a third address range and device 52 is enabled by a Chip Select6 signal 69 when data processor 10 accesses a fourth address range. Additionally, device 56 is enabled by a Chip Select5 signal 68 when data processor 10 accesses a fifth address range. Likewise, when data processor 10 accesses an address within a sixth address range corresponding to integrated circuit 72, a Chip Select4 signal 67 is asserted.

When one of a plurality of Chip Select signals is asserted, other control information must also be provided to correctly interface with a corresponding external device. For example, assume the Chip Select3 signal 66 is asserted to indicate that data processor 10 has accessed an address location associated with device 51. Again, when the Chip Select3 signal 66 is asserted, other control information must also be provided to correctly interface with a corresponding external device. For example, even if the Chip Select1 signal 64 is asserted, an Output Enable signal and a Write Enable signal must also be asserted. Additionally, because memories 56 and 58 each require an Upper Byte (UB) enable input and a Lower Byte (LB) enable input, at least one of the four Enable Byte signals corresponding to either memory must be asserted. In the example illustrated in FIG. 1, devices 56 and 58 provide data having sixteen bits. Because the data has sixteen bits, devices 56 and 58 also require data processor 10 to specify whether one or both of the upper and lower bytes of this data value are to be communicated with data processor 10. Therefore, in this example, the plurality of Byte Enable signals must selectively enable either device 56 or device 58 to communicate one or both of the upper and lower bytes of data. Whether the data is read or written is determined by a value of the Write Enable signal provided to a R/$\overline{\text{W}}$ input of each of devices 56 and 58. Similarly, when the Chip Select4 signal 67 is asserted to indicate that data processor 10 has accessed an address location stored in integrated circuit 72, the plurality of Enable Byte signals must be asserted.

In addition to providing Write Enable signals to merely indicate that data should be read or written, data processor 10 also configures the plurality of integrated circuit terminals 124 to communicate data with an external device on one or more preselected byte lanes. The byte lane, or group of eight integrated circuit terminals comprising a byte of the data bus, is determined by a value stored in a chip select register which corresponds to the accessed external device. Furthermore, unlike prior art implementations, the byte lane is not assigned to a fixed group of data bits in the present embodiment of the invention. For example, an eight bit data value may be communicated either by a first byte lane which includes data bits thirty-one through twenty-four, by a second byte lane which includes data bits twenty-three through sixteen, by a third byte lane which includes data bits fifteen through eight, or by a fourth byte lane which includes data bits seven through zero. Similarly, a sixteen bit data value may be communicated by data bits thirty-one through sixteen or by data bits fifteen through zero.

A number of required byte lanes and the configuration of the byte lanes on the plurality of integrated circuit terminals of data processor 10 are determined by a data port size value stored in a chip select register stored in system integration unit 22 of FIG. 2. In the present embodiment of the invention, the data port size value is stored in the chip select register to indicate a data bus width of an external device which corresponds to the chip select register. Additionally, the data port size value indicates a plurality of integrated circuit terminals of data processor 10 which will be used to communicate information between the external device and data processor 10. By programming the data port size value in an internal register of data processor 10, the present invention provides for greater flexibility for configuring communication between a plurality of external devices and data processor 10. The flexible communication between data processor 10 and a plurality of external devices will subsequently be discussed in greater detail.

To begin discussing the communication protocol between data processor 10 and a remaining portion of data processing system 15, operation of data processing system 10 will be discussed in greater detail. To implement the functionality of the present invention, the plurality of control registers 94 (as illustrated in FIG. 3) determine the port data size value, and therefore, a port size and an integrated circuit pin configuration, during external device access operations. The plurality of control registers 94 and the dynamic controllability of the data port size value will subsequently be discussed in greater detail.

During operation of data processor 10, the plurality of control registers 94 (as illustrated in FIG. 2) are written with control information prior to execution of a data processing operation which performs a memory access. Furthermore, during operation of data processor 10, CPU 12 is capable of initiating an external bus cycle. An external bus cycle is a bus cycle that is driven external to data processor 10 via busses 60 and 62. CPU 12 initiates an external bus cycle by driving an address value, a corresponding data value, and appropriate control signals on bus 24.

Referring to FIG. 2, compare circuitry 101 receives the address value from bus 24 and a plurality of address range bits from bits [0:10] of one of the plurality of control registers 300 and 400 of control registers 94. Compare circuitry 101 then determines an address range associated with the received address value. In one embodiment of the present invention, compare circuitry 101 compares at least a portion of the address value from bus 24 to each set of address range bits provided by the plurality of control registers 94. In the present invention, address bits [31:20] are provided by each of the plurality of control registers 94. However, in alternate embodiments of the present invention, the plurality of address range bits may use any method and any number of bit fields to specify an address range.

Compare circuitry 101 then transfers Match signals 121 to control circuitry 102. Match signals 121 indicate which address range and, therefore, which Chip Select signal and which one of the plurality of registers 300 through 400 (of the plurality of control registers 94 illustrated in FIG. 3) will be used to provide control information to control circuitry 102. Control circuitry 102 then provides control signals 118 to chip select generation circuitry 104 to select which of the plurality of Chip Select signals 64 through 69 is to be asserted. Control circuitry 102 also sends control signals to the plurality of control registers 94 via conductors 122 to select which of the plurality of registers 300 through 400 will be selected.

For example, if the received address value is in a first address range specified by a first plurality of address range bits, control circuitry 102 will select a first control register of the plurality of control registers 94. When the first control register is selected, the first control register will provide a first port data size (DSZ) value to control circuitry 102 via signal 122. Similarly, if a second received address value is in a second address range specified the a second plurality of address range bits, control circuitry 102 will select a second control register of the plurality of control registers 94. When the second control register is selected, the second control register will provide a second DSZ value to control circuitry 102. By dynamically providing the DSZ values in response to a value stored in one of the plurality of control registers 300 and 400 which is associated with a predetermined Chip Select signal, the data port size and the integrated circuit pin configuration may be dynamically modified on each memory access by data processor 10. Unlike prior art implementations, the present invention is able to determine a data bus width and a plurality of integrated circuit terminals which will receive the information transferred via the data bus in a flexible manner which does not require either fixed pin configuration or receipt of formatting signals when the external device is accessed. Furthermore, the present invention is able to determine the data bus width and a configuration of the plurality of integrated circuit terminals on a cycle by cycle basis as different external devices with different bus widths are accessed.

As previously mentioned, the plurality of control registers 94 will provide chip select control bits to control circuitry 102 via conductors 122 and will provide a Select signals 114 to bus coupling circuitry 100. Based on the values provided by Select signals 114, bus coupling circuitry 100 will determine with which of bus 60 and bus 62 information should be communicated. Control circuitry 102 may provide timing or other control information to bus coupling circuit 100 via the plurality of conductors 116. The information provided by control circuitry 102 to bus coupling circuit 100 via the plurality of conductors 116 includes the DSZ value stored in an accessed one of the plurality of control registers 94. The DSZ value is provided to bus coupling circuitry 100 to enable bus coupling circuitry 100 to indicate a number and a configuration of integrated circuit terminals 124 that will be accessed during a data communication operation.

In FIG. 2, it should be noted that the plurality of terminals 124 provide bus 60 externally to data processor 10. The plurality of terminals 126 provide bus 62 externally to data processor 10 and the plurality of terminals 128 provide chip select signals 64 through 69 externally to data processor 10.

Figure 4:
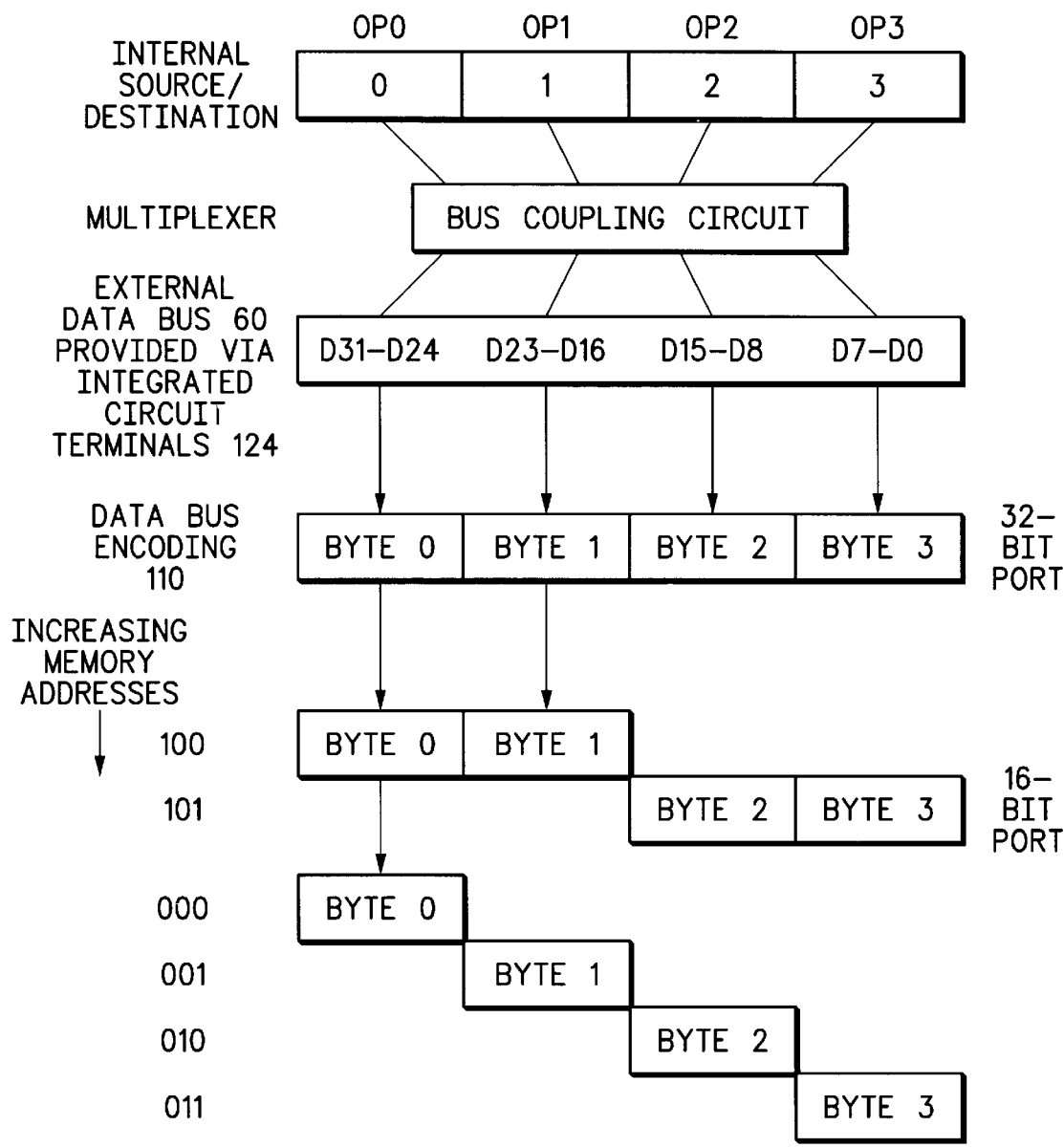
FIG. 4 illustrates in flow diagram form a method for executing a bus sizing operation in accordance with one embodiment of the present invention.

To configure the plurality of integrated circuit terminals 124, bus coupling circuitry 100 evaluates the DSZ value and selectively enables a portion of the plurality of integrated circuit terminals in response thereto. FIG. 4 illustrates a flow diagram which indicates the relationship between the DSZ value provided by the selected one of the plurality of chip select registers 94 and the plurality of integrated circuit terminals 124.

In FIG. 4, when a first device is accessed by an address value in a first address range, a first one of the plurality of chip select registers 94 provides a first DSZ value (DSZ0). If DSZ0 is equal to a binary value of %110, then the plurality of integrated circuit terminals 124 is configured to communicate thirty-two bits of data, transferred in four operand bytes OP0 through OP3, via all of the plurality of integrated circuit terminals 124 (D31 through D0). Similarly, if DSZ0 is equal to a binary value of %100, then the plurality of integrated circuit terminals 124 is configured to communicate sixteen bits of data via a first set of integrated circuit terminals 124 which is labeled D31 through D16. The sixteen bits of data are provided by any combination of two of the four operand bytes OP0 through OP3. If DSZ0 is equal to a binary value of %101, then the plurality of integrated circuit terminals 124 is configured to communicate sixteen bits of data via a second set of integrated circuit terminals 124 which is labeled D15 through D0. Again, the sixteen bits of data are provided by any combination of two of the four operand bytes OP0 through OP3. Additionally, if DSZ0 is equal to a binary value of %000, then the plurality of integrated circuit terminals 124 is configured to communicate eight bits of data via a third set of integrated circuit terminals 124 which is labeled D31 through D24. If DSZ0 is equal to a binary value of %001, then the plurality of integrated circuit terminals 124 is configured to communicate eight bits of data via a fourth set of integrated circuit terminals 124 which is labeled D23 through D16. If DSZ0 is equal to a binary value of %010, then the plurality of integrated circuit terminals 124 is configured to communicate eight bits of data via a fifth set of integrated circuit terminals 124 which is labeled D15 through D8. If DSZ0 is equal to a binary value of %011, then the plurality of integrated circuit terminals 124 is configured to communicate eight bits of data via a sixth set of integrated circuit terminals 124 which is labeled D7 through D0. When only a byte of data is communicated, the eight bits of data are provided by any one of the four operand bytes OP0 through OP3.

Furthermore, when any one of the plurality of control registers 94 is accessed, the DSZ value stored therein configures the plurality of integrated circuit terminals 124 in a similar manner. For example, when a second device is accessed by an address value in a second address range, a second one of the plurality of chip select registers 94 provides a second DSZ value (DSZ1). If DSZ1 is equal to a binary value of %110, then the plurality of integrated circuit terminals 124 is configured to communicate thirty-two bits of data, transferred in four operand bytes OP0 through OP3, via all of the plurality of integrated circuit terminals 124 (D31 through D0). Similarly, if DSZ1 is equal to a binary value of %100, then the plurality of integrated circuit terminals 124 is configured to communicate sixteen bits of data via a first set of integrated circuit terminals 124 which is labeled D31 through D16. The sixteen bits of data are provided by any combination of two of the four operand bytes OP0 through OP3. If DSZ1 is equal to a binary value of %101, then the plurality of integrated circuit terminals 124 is configured to communicate sixteen bits of data via a second set of integrated circuit terminals 124 which is labeled D15 through D0. Again, the sixteen bits of data are provided by any combination of two of the four operand bytes OP0 through OP3. Additionally, if DSZ1 is equal to a binary value of %000, then the plurality of integrated circuit terminals 124 is configured to communicate eight bits of data via a third set of integrated circuit terminals 124 which is labeled D31 through D24. If DSZ1 is equal to a binary value of %001, then the plurality of integrated circuit terminals 124 is configured to communicate eight bits of data via a fourth set of integrated circuit terminals 124 which is labeled D23 through D16. If DSZ1 is equal to a binary value of %010, then the plurality of integrated circuit terminals 124 is configured to communicate eight bits of data via a fifth set of integrated circuit terminals 124 which is labeled D15 through D8. If DSZ1 is equal to a binary value of %011, then the plurality of integrated circuit terminals 124 is configured to communicate eight bits of data via a sixth set of integrated circuit terminals 124 which is labeled D7 through D0. When only a byte of data is communicated, the eight bits of data are provided by any one of the four operand bytes OP0 through OP3.

By programming the DSZ value stored in a one of the plurality of control registers 94, the user may configure the data processor 10 to communicate either eight, sixteen, or thirty-two bit data via an appropriate byte lane or plurality of byte lanes depending on an external device which was accessed. Such flexibility allows a user to balance loading on each of the plurality of integrated circuit terminals such that power consumption and timing may be optimized. Furthermore, because the data transferred on each of the plurality of integrated circuit terminals 124 is balanced, the average power consumed by data processing system 15 is lowered and the capacitance associated with over-loading is distributed.

A description of operation of the present invention has been provided above. To further clarify operation of the invention, an example of the operation of data processing system 15 will be provided in greater detail below.

EXAMPLE OF OPERATION OF THE PRESENT INVENTION

As an example, assume a first address accessed by data processor 10 corresponds to device 58. Therefore, the Chip Select2 signal 65 is asserted. Furthermore, assume that a user of data processing system 15 programmed the plurality of control registers 94 appropriately. Therefore, when control circuitry 102 indicates that device 58 has been accessed, a corresponding one of the plurality of control registers 94 is also accessed. The corresponding one of the plurality of control registers 94 provides the EBControl signal to decode logic 105 and the DSZ value to control circuitry 102. Decode logic 105 only asserts the Enable Byte signals which correspond to the accessed memory location.

In this first example, a first Enable Byte signal is needed for the UB input and a second Enable Byte signal is needed for the LB input of the memory being accessed. Furthermore, in this first example, decode logic 105 asserts the Enable Byte signals in response to the EBControl signal, the Size signal, and the Address signal. Therefore, when the Size signal indicates that two bytes should be accessed, each of the Enable Byte signals 204 and 206 is asserted to enable data processor 10 to access the upper and lower bytes of data stored in device 58. Furthermore, if the corresponding one of the plurality of control registers 94 is programmed correctly, the DSZ value will enable bus coupling circuitry 100 to communicate a sixteen bit data value on an appropriate combination of byte lanes. Therefore, when the DSZ value of corresponding one of the plurality of control registers 94 is programmed to a value of $100 and enabled correctly, device 58 communicates sixteen bits of data to the plurality of integrated circuit terminals D31 through D16 via Bus 60. Similarly, when the DSZ value of corresponding one of the plurality of control registers 94 is programmed to a value of $101 and enabled correctly, device 56 communicates sixteen bits of data to the plurality of integrated circuit terminals D15 through D0 via Bus 60.

In a second example, assume that only a single byte should be accessed and the Size signal indicates this requirement to decode logic 105. The Address signal is then used to determine whether an upper byte or a lower byte should be accessed. In this example, if data processor 10 writes a value only to the upper byte of an address value stored in device 56, Enable Byte 208 signal will be asserted. Additionally, the Chip Select5 signal 68 and the Write Enable signal will be asserted. Furthermore, if the corresponding one of the plurality of control registers 94 is programmed correctly before beginning the present operation, the DSZ value will enable bus coupling circuitry 100 to communicate an eight bit data value on an appropriate byte lane of Bus 60.

In the present embodiment of the invention, the DSZ values are programmed during initialization of data processor 10. Generally, the DSZ values are dependent on a circuit board configuration of data processing system 15 and are not modified during subsequent operation of data processing system 15. Therefore, the DSZ values must be carefully programmed to correctly implement a circuit board configuration of data processing system 15. For example, when the DSZ value of corresponding one of the plurality of control registers 94 is programmed to a value of $000 and enabled correctly, device 56 would communicate eight bits of data to the plurality of integrated circuit terminals D31 through D24 via Bus 60. Similarly, when the DSZ value of corresponding one of the plurality of control registers 94 is programmed to a value of $001 and enabled correctly, device 56 would communicate eight bits of data to the plurality of integrated circuit terminals D24 through D16 via Bus 60. When the DSZ value of corresponding one of the plurality of control registers 94 is programmed to a value of $010 and enabled correctly, device 56 would communicate eight bits of data to the plurality of integrated circuit terminals D15 through D8 via Bus 60. Additionally, when the DSZ value of corresponding one of the plurality of control registers 94 is programmed to a value of $011 and enabled correctly, device 56 would communicate eight bits of data to the plurality of integrated circuit terminals D7 through D0 via Bus 60. As previously stated, the programmed value of the DSZ value is dependent on a printed circuit board configuration of data processing system 15 in the present embodiment of the invention.

As a third example, assume a first address accessed by data processor 10 corresponds to integrated circuit 72. Therefore, the Chip Select4 signal 67 is asserted. Furthermore, assume that a user of data processing system 15 programmed the plurality of control registers 94 appropriately during initialization of data processor 10. Therefore, when control circuitry 102 indicates that device 72 has been accessed, a corresponding one of the plurality of control registers 94 is also accessed. The corresponding one of the plurality of control registers 94 provides the EBControl signal to decode logic 105 and the DSZ value to control circuitry 102. Decode logic 105 only asserts the Enable Byte signals which correspond to the accessed memory location.

In this example, all Enable Byte signals may be asserted because integrated circuit 32 has a thirty-two bit data width. Therefore, when the Size signal indicates that four bytes should be accessed, each of the Enable Byte signals 204 through 210 is asserted to enable data processor 10 to access all thirty-two bits of data stored in device 72. Furthermore, if the corresponding one of the plurality of control registers 94 is programmed correctly during initialization of data processor 10, the DSZ value will enable bus coupling circuitry 100 to communicate a thirty-two bit data value on all byte lanes. Therefore, when the DSZ value of corresponding one of the plurality of control registers 94 is programmed to a value of $110 and enabled correctly, device 72 communicates thirty-two bits of data to the plurality of integrated circuit terminals D31 through D0 via Bus 60.

The three previous examples illustrate the flexible interface and integrated circuit terminal configuration of the present invention. As was illustrated above, external devices are not assigned or required to communicate with predetermined byte lanes. Rather, the user may program the plurality of control registers 94 to correlate to an appropriate external device or group of external devices such that all data bits are used on a substantially equal basis. Such flexibility allows a user to balance loading on each of the plurality of integrated circuit terminals such that power consumption and timing may be optimized. Furthermore, because the data transferred on each of the plurality of integrated circuit terminals 124 is balanced, the average power consumed by data processing system 15 is lowered and the capacitance associated with over-loading is distributed.

The implementation of the invention described herein is provided by way of example only and many other implementations may exist for executing the function described herein. For example, the DSZ in each of the plurality of control registers 94 may be expanded to include more bits and, therefore, provide for greater functionality. Furthermore, the DSZ bit may be stored in a register which is not associated with a chip select for each of the plurality of external devices, but in a register or memory which is accessed independently of the chip select register.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

We claim:

1. A data processor, comprising:

a central processing system for communicating a plurality of address values, a plurality of data values, and a plurality of control values;

a plurality of integrated circuit terminals; and a system integration unit, the system integration unit, comprising:

a control circuit coupled to the central processing unit for receiving the plurality of control values, the control value providing a first control value corresponding to a first external device;

a plurality of control registers coupled to the control circuit for receiving the first control value, a first one of the plurality of control registers selectively providing a first data size value when the first control value corresponds to a first predetermined value and a second one of the plurality of control registers selectively providing a second data size value when the first control value corresponds to a second predetermined value; and a bus coupling circuit coupled to the central processing unit for receiving the plurality of data values and coupled to the plurality of control registers for receiving the first data size value or the second data size value, the bus coupling circuit coupled to the plurality of integrated circuit terminals to provide a first one of the plurality of data values onto a first subset of the plurality of integrated circuit terminals and to a provide a second one of the plurality of data values onto a second subset of the plurality of integrated circuit terminals, wherein a width of the first one of the plurality of data values is equal to the width of the second one of the plurality of data values and wherein the first subset is not identical to the second subset.

2. The data processor of claim 1 wherein the first subset and the second subset contain no common members.

3. The data processor of claim 2 wherein each one of the plurality of control registers corresponds to a differing one of a plurality of external devices.

4. The data processor of claim 1 wherein each one of the plurality of control registers corresponds to a differing one of a plurality of external devices.

5. A method for accessing an external device in a data processor. comprising the steps of:

during a first time,
generating a first address value, a first data value, and a first control value with a central processing unit;
comparing the first address value to a plurality of address ranges;
generating a first location value responsive to the step of comparing;
coupling the first data value to a first subset of a bus;

during a second time,
generating a second address value, a second data value, and a second control value with the central processing unit;
comparing the second address value to the plurality of address ranges;
generating a second location value responsive to the step of comparing; and
coupling the second data value to a second subset of a bus, wherein a width of the first data value is equal to the width of the second data value and wherein the first subset and the second subset is not identical.

6. The method of claim 5 wherein the first data value corresponds to a first external device and the second data value corresponds to a second external device.

7. The method of claim 6 wherein the first subset and the second subset contain no common members.

8. The method of claim 5 wherein the first subset and the second subset contain no common members.

* * * * *

UNITED STATES PATENT AND TRADEMARK OFFICE
CERTIFICATE OF CORRRECTION

PATENT NO. : 5,812,798
DATED : September 22, 1998
INVENTOR(S) : Moyer et al.

It is certified that error appears in the above-identified patent and that said Letters Patent is hereby corrected as shown below:

On the title page, add the following to item [56]:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 5 | 97 | 4 | 4 | 1 | A1 | May 18, 1994 | EPO | | | | |
| | | 0 | 6 | 51 | 3 | 3 | 3 | A1 | May 3, 1995 | EPO | | | | |
| | | | | | | | | | | | | | | |

Signed and Sealed this

Sixth Day of April, 1999

Attest:

Q. TODD DICKINSON

*Attesting Officer*

*Acting Commissioner of Patents and Trademarks*